United States Patent [19]

Jensen et al.

[11] Patent Number: 5,268,444
[45] Date of Patent: Dec. 7, 1993

[54] PHENYLETHYNYL-TERMINATED POLY(ARYLENE ETHERS)

[75] Inventors: Brian J. Jensen, Williamsburg; Robert G. Bryant, Poquoson; Paul M. Hergenrother, Yorktown, all of Va.

[73] Assignee: The United States of America as represented by the Administrator of the National Aeronautics and Space Administration, Washington, D.C.

[21] Appl. No.: 45,336

[22] Filed: Apr. 2, 1993

[51] Int. Cl.$^5$ .............................................. C08G 8/02
[52] U.S. Cl. .................................... 528/125; 528/126; 528/151; 528/152; 528/153; 528/155; 528/219; 528/220
[58] Field of Search ............... 528/125, 126, 151, 152, 528/153, 155, 219, 220

[56] References Cited

U.S. PATENT DOCUMENTS

| | | | |
|---|---|---|---|
| 4,175,175 | 11/1979 | Johnson et al. | 528/125 |
| 4,331,798 | 5/1982 | Staniland et al. | 528/125 |
| 4,774,314 | 9/1988 | Winslow et al. | 528/126 |
| 4,786,694 | 11/1988 | Clendinning et al. | 525/471 |
| 4,931,530 | 6/1990 | Fukawa et al. | 528/125 |
| 5,051,495 | 9/1991 | Staniland et al. | 528/499 |
| 5,081,214 | 1/1992 | Schneller | 528/125 |
| 5,138,028 | 8/1992 | Paul et al. | 528/353 |
| 5,194,561 | 3/1993 | Fischer et al. | 528/125 |

OTHER PUBLICATIONS

P. M. Hergenrother et al., "Acetylene-Terminated Prepolymers", *Encycl. Polym. Sci. Eng.* vol. 1, 2nd edition, John Wiley & Sons, Inc. New York, N.Y. (1985), pp. 61–86.

G. Lucotte, et al., "Ethynyl-Terminated Polyethers from New End-Capping Agents. II, End-Chain Funtionalization through Nitro Displacement", *J. Polym. Sci., Part A: Polym. Chem.*, vol. 29, (1991), pp. 897–903.

B. Delfort et al., "Ethynyl-Terminated Polyethers from New End-Capping Agents: Synthesis and Characterization", *J. Polym. Sci., Part A: Polym. Chem.*, vol. 28, (1990), pp. 2451–2464.

*Primary Examiner*—John Kight, III
*Assistant Examiner*—S. A. Acquah
*Attorney, Agent, or Firm*—George F. Helfrich

[57] ABSTRACT

Phenylethynyl-terminated poly(arylene ethers) are prepared in a wide range of molecular weights by adjusting monomer ratio and adding an appropriate amount of 4-fluoro-4'-phenylethynylbenzophenone during polymer synthesis. The resulting phenylethynyl-terminated poly(arylene ethers) react and crosslink upon curing for one hour at 350° C. to provide materials with improved solvent resistance, higher modulus and better high temperature properties than the linear, uncrosslinked polymers.

15 Claims, 1 Drawing Sheet

General Synthesis of Phenylethynyl-terminated Oligomers

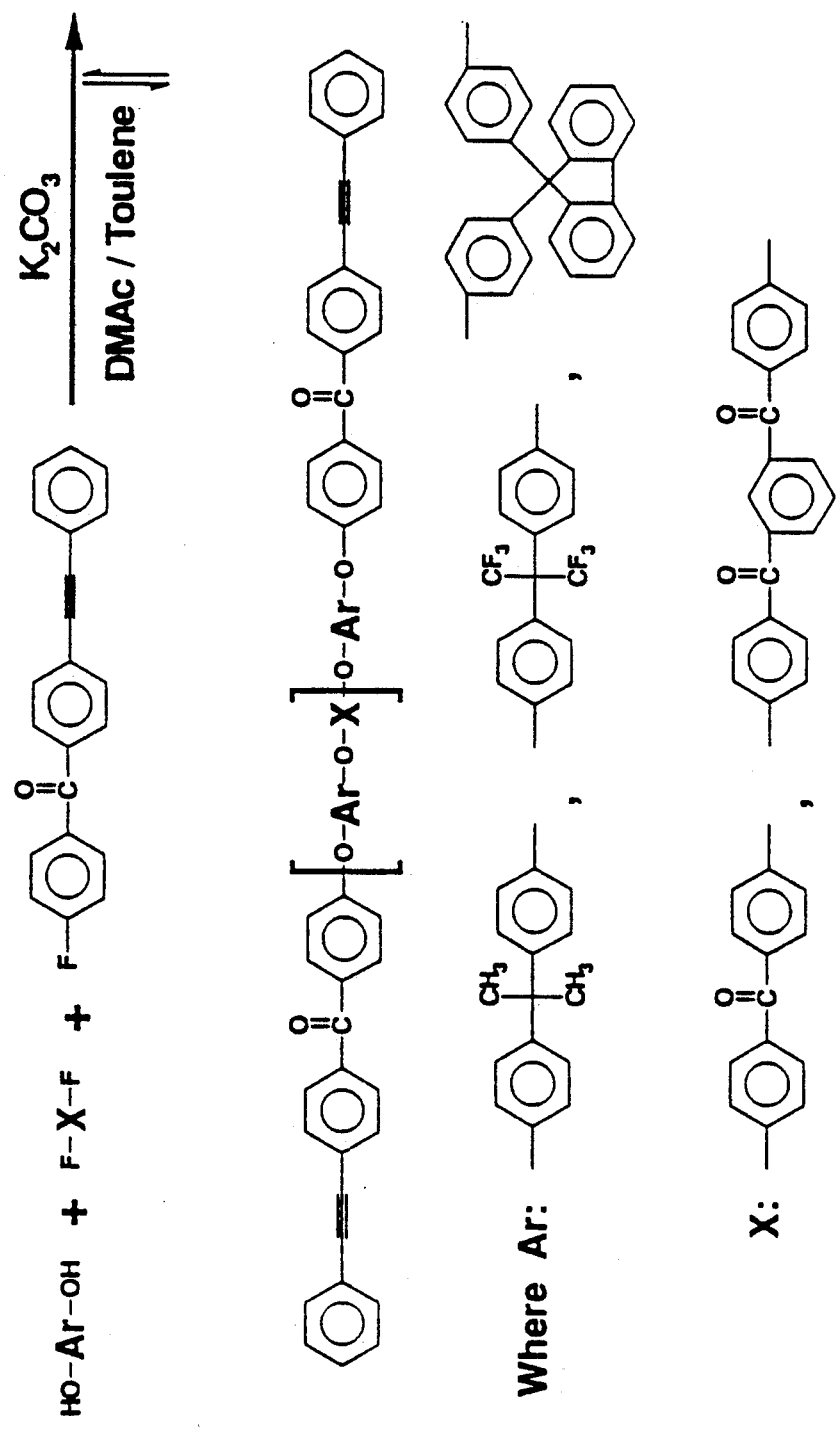
General Synthesis of Phenylethynyl-terminated Oligomers

PHENYLETHYNYL-TERMINATED POLY(ARYLENE ETHERS)

ORIGIN OF THE INVENTION

The invention described herein was made by employees of the United States Government and may be manufactured and used by or for the Government for governmental purposes without the payment of any royalties thereon or therefor.

CROSS-REFERENCE TO RELATED APPLICATIONS

This application is related to co-pending patent application Ser. No. 08/045,343, filed Apr. 2, 1993, entitled "PHENYLETHYNYL ENDCAPPING REAGENTS AND REACTIVE DILUENTS".

BACKGROUND OF THE INVENTION

1. Field of the Invention

This invention relates generally to acetylene-terminated oligomers. It relates particularly to a series of phenylethynyl-terminated poly(arylene ethers) which can be thermally cured to resins that are useful as adhesives, composite matrices, and moldings.

2. Description of Related Art

Poly(arylene ethers) are condensation polymers commonly synthesized by nucleophilic displacement of activated aromatic halides in polar solvents by alkali metal phenates to form a repeat unit of the general type

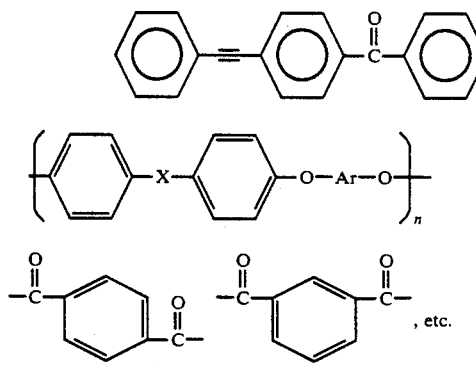

wherein

Ar is arylene and X is CO, $SO_2$,

Nucleophilic displacement reactions leading to high molecular weight poly(arylene ethers) were initially reported in 1958 (A. Kreuchumas, U.S. Pat. No. 2,822,351). Since then numerous papers and patents have appeared, such as R. N. Johnson et al., *Polym. Sci. A*-1, 5, 2375 (1967), S. V. Vinogradova et al., *Polym. Sci. USSR*, 14, 2963 (1972), J. B. Rose, *Polymer*, 15, 456 (1974), T. E. Attwood et al., *Polym. Prepr.*, 20(1), 191 (1979), T. E. Attwood et al., *Polymer*, 22 1096 (1981), R. Viswanathan et al., *Polymer*, 25, 1927 (1984), P. M. Hergenrother et al., *Polymer*, 29, 258 (1988), M. E. B. Jones, British Patent No. 1,016,245, H. A. Vogal, British Pat. No. 1,060,546, I. Goodman et al., British Patent No. 971,277 (1964), A. G. Farnham et al., British Patent No. 1,078,234, and A. G. Farnham, U.S. Pat. No. 4,175,175. Poly(arylene ethers) are known for their good mechanical properties, good thermooxidative stability and relative ease of processing. Several poly(arylene ethers) such as Udel ® polysulfone (Amoco), Kadel ® polyketone (Amoco), PEEK ® polyetheretherketone (ICI) and Victrex ® PES polyethersulfone (ICI) are commercially available and used as films, moldings, adhesives and composite matrices.

The majority of poly(arylene ethers) are amorphous and are therefore soluble in common organic solvents. Those poly(arylene ethers) that are semicrystalline are typically insoluble in these solvents. Certain applications, such as adhesives or composite matrices on commercial or military aircraft, require resistance to aircraft fluids (jet fuel, hydraulic fluid, etc.) and paint strippers as well as temperature cycling. To make poly(arylene ethers) more desirable for use in these applications, ethynyl and substituted ethynyl groups have been incorporated into the polymer by a variety of methods to produce thermosetting materials. A review of acetylene-terminated prepolymers has been published by P. M. Hergenrother, in H. Mark, ed. *Encycl. Polym. Sci. Engr.*, 2nd ed., Vol. 1, John Wiley & Sons, Inc., New York, 61 (1985).

SUMMARY OF THE INVENTION

The primary object of the present invention is to provide a series of phenylethynyl-terminated poly(arylene ethers) with various molecular weights that can be thermally cured to provide materials that are crosslinked and insoluble in common organic solvents.

This object and its attending benefits are achieved according to the present invention by the provision of novel phenylethynyl-terminated poly(arylene ethers) having the general structure

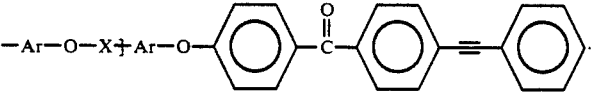

Ar is any dihydroxy moiety capable of undergoing aromatic nucleophilic substitution, typically a bisphenolic moiety. Especially beneficial results are obtained when Ar is

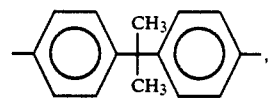

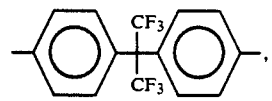

or

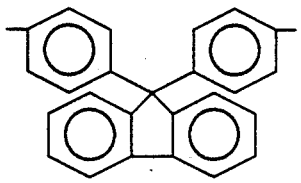

X is any difunctional moiety capable of undergoing aromatic nucleophilic substitution. Especially beneficial results are obtained when X is

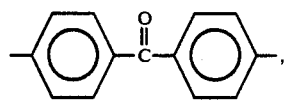

or

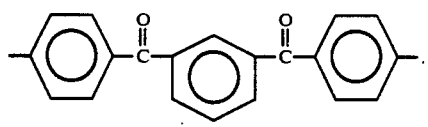

The number average molecular weight of the phenylethynyl-terminated poly(arylene ethers) according to the present invention is broadly between about 1,000 and 100,000, advantageously between about 3,000 and 15,000, and preferably between about 3,000 and 9,000.

The specific approach used herein was to prepare phenylethynyl-terminated poly(arylene ethers) by using 4-fluro-4'-phenylethynylbenzophenone to end-cap oligomers. By adjusting monomer stoichiometry, the molecular weight of the resulting phenylethynyl-terminated poly(arylene ether) was controlled. It is noted that others have reported the use of 4-ethynyl-4'-fluorobenzophenone and 4-ethynyl-4'-fluorodiphenylsulfone [B. Delfort, G. Lucotte and L. Cormier, *J. Polym. Sci. Polym. Chem*, 28, 2451 (1990)]; or 4-ethynyl-4'-nitrobenzophenone and 4-ethynyl-3'-nitrodiphenylsulfone [G. Lucotte, L. Cormier and B. Delfort, *J. Polym. Sci. Polym. Chem.*, 29, 897 (1991)] to prepare ethynyl-terminated poly(arylene ethers). However, there is no report of phenylethynyl-terminated poly(arylene ethers) or any suggestion of their outstanding properties.

BRIEF DESCRIPTION OF THE DRAWING

For a more complete understanding of the present invention including its object and benefits, reference should be made to the Description of the Preferred Embodiments. This Description should be read together with the accompanying drawing, wherein the sole figure is a representation of the general synthetic procedure employed to prepare phenylethynyl-terminated poly(arylene ethers) according to the present invention.

DESCRIPTION OF THE PREFERRED EMBODIMENTS

According to the present invention, phenylethynyl-terminated poly(arylene ethers) were synthesized with different polymer backbones and different molecular weights. After curing one hour at 350° C., the resulting polymers were crosslinked and insoluble in common organic solvents. Molecular weights prepared included both 3000 and 6000 g/mole. However, this is not viewed a limitation, since essentially any molecular weight from 1000 to 100,000 g/mole is easily prepared by adjusting monomer stoichiometry. A modified Carothers equation, $$Dp = \frac{1 + r}{1 - r},$$

where r=monomer ratio and Dp=degree of polymerization, provides a means to calculate the monomer ratio necessary to produce the desired molecular weight. The general synthetic procedure is shown in the figure. Data for theoretical and experimental number average molecular weights, inherent viscosities and titanium to titanium tensile shear strengths are included in Table I for six different polymer backbones, each at two different molecular weights. Data for uncured and cured glass transition temperatures and thermal stability in air and nitrogen is included in Table II. The phenylethynyl-terminated poly(arylene ethers) are eminently suitable as adhesives, composite matrices, and moldings for a variety of applications.

Referring now to the Figure, the general reaction scheme for preparing the phenylethynyl-terminated poly(arylene ethers) is shown, where N is an integer from 1-100 repeat units. The solvent is preferably DMAc, but may be N-methylpyrrolidinone (NMP), N,N-dimethylformamide (DMF), dimethylsulfoxide (DMSO) or sulfolane. Ar is any dihydroxy moiety capable of undergoing aromatic nucleophilic substitution, especially a bisphenolic moiety. X is any difunctional moiety capable of undergoing aromatic nucleophilic substitution. Ar and X can be selected from the following:

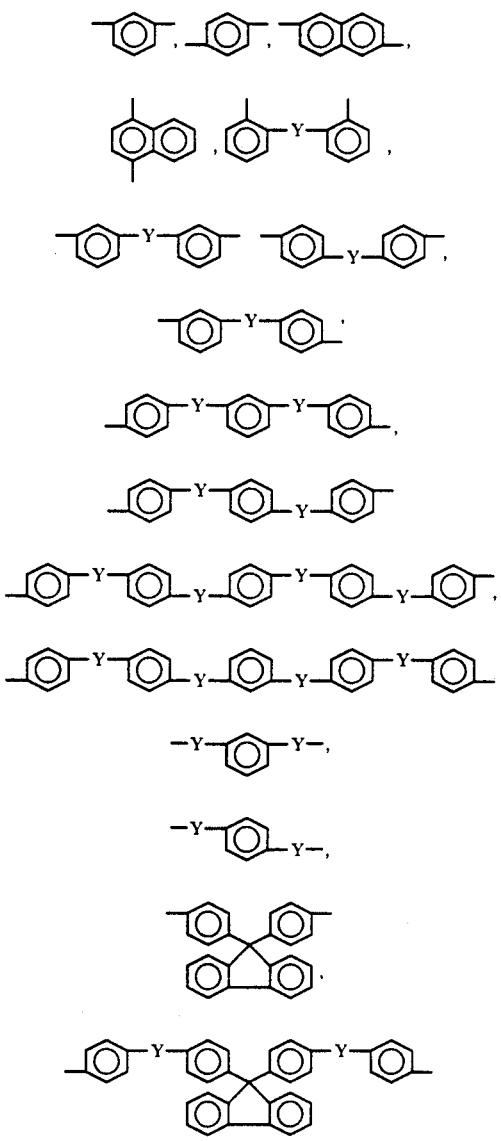

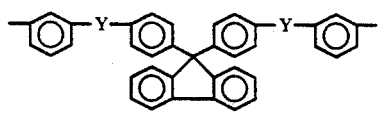

wherein Y=nil, O, S, O=C, SO₂, CH₂, C(CH₃)₂, C(CF₃)₂ and mixtures thereof.

Phenylethynyl-terminated poly(arylene ethers) with a wide range of molecular weights (1,000 to 100,000 g/mole) are readily prepared by offsetting the ratio of one monomer to the other by a precalculated amount and adding an appropriate amount of 4-fluoro-4'-phenylethynylbenzophenone. When cured, different molecular weight polymers display different properties. For example low molecular weight phenylethynyl-terminated poly(arylene ethers) provide a higher crosslink density upon curing than high molecular weight phenylethynyl-terminated poly(arylene ethers). High crosslink density normally produces better solvent resistance, higher modulus, better high temperature properties and lower toughness than low crosslink density. Therefore, the polymers can be designed with the proper combination of properties for the desired application by controlling the molecular weight.

SPECIFIC EXAMPLES

Example I

The following illustrates the synthesis of a phenylethynyl-terminated poly(arylene ether) with theoretical number average molecular weight of 6000 g/mole. 1,3-Bis(4-fluorobenzoyl)benzene (1,3-FBB) (0.01837 m, 5.9209 g), 2,2-bis(4-hydroxyphenyl)propane (BPA) (0.02 m, 4.5659 g), 4-phenylethynyl-4'-fluorobenzophenone (0.00326 m, 0.9791 g), potassium carbonate (0.044 m, 6.08 g), N,N-dimethylacetamide (DMAc) (46 g) and toluene (20 ml) were added to a three-neck flask equipped with a Dean-Stark trap and nitrogen purge. The reaction was stirred and heated to 155° C. for about four hours, while collecting a toluene/water azeotropic mixture, and held at 155° C. overnight. The reaction was filtered and precipitated in a water/acetic acid mixture (10:1). The precipitate was washed in water and boiling methanol and dried at 100° C. to form an off-white solid in >95% yield. The resulting phenylethynyl-terminated poly(arylene ether) had $\eta_{inh}=0.22$ dL/g in chloroform at 25° C.

Example II

The following illustrates the synthesis of a phenylethynyl-terminated poly(arylene ether) with theoretical number average molecular weight of 3000 g/mole. 1,3FBB (0.01855 m, 5.9798 g), BPA (0.022 m, 5.0225 g), 4-phenylethynyl-4'-fluorobenzophenone (0.00690 m, 2.0723 g), potassium carbonate (0.0484 m, 6.69 g), DMAc (52 g) and toluene (20 ml) were added to a three-neck flask equipped with a Dean-Stark trap and nitrogen purge. The reaction was stirred and heated to 155° C. during about four hours, while collecting a toluene/water azeotropic mixture, and held at 155° C. overnight. The reaction was filtered and precipitated in a water/acetic acid mixture (10:1). The precipitate was washed in water and boiling methanol and dried at 100° C. to form an off-white solid in >95% yield. The resulting phenylethynyl-terminated poly(arylene ether) had $\eta_{inh}=0.14$ dL/g in chloroform at 25° C.

Example III

The following illustrates the synthesis of a phenylethynyl-terminated poly(arylene ether) with theoretical number average molecular weight of 6000 g/mole. 4,4'-Difluorobenzophenone (DFB) (0.01836 m, 4.0054 g), 4,4'-(hexafluorisopropylidene)diphenol (BPAF) (0.02 m, 6.7247 g), 4-phenylethynyl-4'-fluorobenzophenone (0.003288 m, 0.9875 g), potassium carbonate (0.044 m, 6.08 g), DMAc (35 g) and toluene (30 ml) were added to a three-neck flask equipped with a Dean-Stark trap and nitrogen purge. The reaction was stirred and heated to 155° C. during about four hours, while collecting a toluene/water azeotropic mixture, and held at 155° C. overnight. The reaction was filtered and precipitated in a water/acetic acid mixture (10:1). The precipitate was washed in water and boiling methanol and dried at 100° C. to form an off-white solid in >95% yield. The resulting phenylethynyl-terminated poly(arylene ether) had $\eta_{inh}=0.18$ dL/g in chloroform at 25° C.

Example IV

The following illustrates the synthesis of phenylethynyl-terminated poly(arylene ethers) with theoretical number average molecular weight of 3000 g/mole. DFB (0.003368 m, 0.7349 g), BPAF (0.004 m, 1.3449 g), 4-phenylethynyl-4'-fluorobenzophenone (0.001264 m, 0.3796 g), potassium carbonate (0.0088 m, 1.22 g), DMAc (12 g) and toluene (10 ml) were added to a three-neck flask equipped with a Dean-Stark trap and nitrogen purge. The reaction was stirred and heated to 155° C. during about four hours, while collecting a toluene/water azeotropic mixture, and held at 155° C. overnight. The reaction was filtered and precipitated in a water/acetic acid mixture (10:1). The precipitate was washed in water and boiling methanol and dried at 100° C. to form an off-white solid in >95% yield. The resulting phenylethynyl-terminated poly(arylene ether) had $\eta_{inh}=0.11$ dL/g in chloroform at 25° C.

Example V

The following illustrates the synthesis of a phenylethynyl-terminated poly(arylene ether) with theoretical number average molecular weight of 6000 g/mole. DFB (0.9156 m, 199.788 g), 9,9-hydroxyphenylfluorene (HPF) (1.000 m, 350.421 g), 4-phenylethynyl-4'-fluorobenzophenone (0.1688 m, 50.697 g), potassium carbonate (2.20 m, 305 g), DMAc (1700 g) and toluene (200 ml) were added to a three-neck flask equipped with a Dean-Stark trap and nitrogen purge. The reaction was stirred and heated to 155° C. during about four hours, while collecting a toluene/water azeotropic mixture, and held at 155° C. overnight. The reaction was filtered and precipitated in a water/acetic acid mixture (10:1). The precipitate was washed in water and boiling methanol and dried at 100° C. to form an off-white solid in >95% yield. The resulting phenylethynyl-terminated poly(arylene ether) had $\eta_{inh}=0.20$ dL/g in chloroform at 25° C.

Example VI

The following illustrates the preparation of a molding from the polymer described in Example V. The polymer in powder form (8 g) was added to a stainless steel mold 1.25"×1.25" square. The mold was placed in a hydraulic press equipped with electrically heated platens which were preheated. The temperature was increased rapidly to 350° C. with a pressure of 75 psi being applied at 300° C. The temperature was maintained at 350° C. for one hour and the pressure was held at 75 psi. After slowly cooling to room temperature, a light brown molding was obtained. The molding was void free and uniform in composition. The fracture toughness and fracture energy were measured according to ASTM E-399 at 1400 psi×in$^{0.5}$ and 5.8 in-lbs/in$^2$, respectively. This level of toughness is excellent for a crosslinked material to be used as an adhesive or composite matrix for aerospace applications.

Example VII

The following illustrates the preparation of a graphite composite from the polymer described in Example V.

Using a standard drum winder, prepreg was prepared from a 30 weight % solids DMAc polymer solution on Hercules AS-4 (12 K) graphite fiber. This prepreg was dried to >1% volatile content in an air oven, then consolidated in a mold using a hydraulic press equipped with electrically heated platens. A pressure of 200 psi was applied, and the mold was heated rapidly to 350° C., held for one hour at 350° C., then allowed to slowly cool to room temperature. The resulting composites were fully consolidated with very low void content, based upon excellent results when examined by C-scan.

TABLE 1

Phenylethynyl Terminated Poly(arylene-ethers)

| Ar | X | MW (g/mole) Calculated | MW (g/mole) Experimental[a] | $\eta_{inh}$[b] (dL/g) | Tensile Shear[c] Strength (psi) |
|---|---|---|---|---|---|
|  |  | 3000<br>6000 | 2754<br>6085 | 0.21<br>0.32 | 2385<br>3300 |
|  |  | 3000<br>6000 | 3033<br>5921 | 0.11<br>0.18 | 2460<br>3500 |
|  |  | 3000<br>6000 | 2280<br>TBD | 0.10<br>0.20 | 2110<br>TBD |
|  |  | 3000<br>6000 | 2746<br>5804 | 0.14<br>0.22 | 2895<br>3600 |
|  |  | 3000<br>6000 | 2775<br>TBD | 0.11<br>0.17 | 3000<br>3010 |
|  | | 3000<br>6000 | 2812<br>TBD | 0.11<br>0.20 | 2335<br>2725 |

[a]Determined from GPC using chloroform at 23° C.
[b]Inherent viscosity run in chloroform at 25° C. using a concentration of 0.5 g/dL.
[c]Determined from Titanium Lap Shear specimens at 23° C.

TABLE II

Phenylethynyl Terminated Poly(arylene-ethers)

| Ar | X | Experimental MW (g/mole) | Tg (°C)[a] Uncured | Tg (°C)[a] Cured | 5% Weight loss (°C)[b] AIR | 5% Weight loss (°C)[b] N₂ |
|---|---|---|---|---|---|---|
| -Ph-C(CH₃)₂-Ph- | -Ph-C(O)-Ph- | 2754 | 122 | 151 | 458 | 467 |
|  |  | 6085[c] | 153 | 162 | 395 | 450 |
| -Ph-C(CF₃)₂-Ph- | -Ph-C(O)-Ph- | 3033 | 137 | 156 | 467 | 500 |
|  |  | 5921 | 154 | 174 | 460 | 490 |
| fluorenylidene bisphenol | -Ph-C(O)-Ph- | 2280 | 185 | 235 | 418 | 453 |
|  |  | TBD | 215 | 263 | 427 | 510 |
| -Ph-C(CH₃)₂-Ph- | -Ph-C(O)-Ph-C(O)-Ph- | 2746 | 135 | 155 | 453 | 474 |
|  |  | 5804 | 135 | 163 | 415 | 445 |
| -Ph-C(CF₃)₂-Ph- | -Ph-C(O)-Ph-C(O)-Ph- | 2775 | 125 | 166 | 407 | 432 |
|  |  | TBD | 149 | 180 | 450 | 512 |
| fluorenylidene bisphenol | -Ph-C(O)-Ph-C(O)-Ph- | 2812 | 175 | 225 | 468 | 512 |
|  |  | TBD | 205 | 235 | 453 | 491 |

[a] Inflection point of DSC Thermogram at a heating rate of 20° C./min.
[b] By TGA at a heating rate of 2.5° C./min.
[c] Film cured 1 hour at 350° C., gave modulus of 326 ksi at 23° C., films of other materials were brittle.

We claim:

1. A phenylethynyl-terminated poly(arylene ether) having the general structure

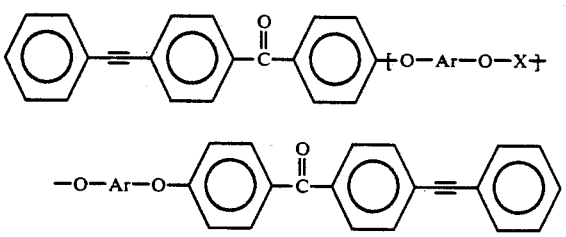

wherein Ar is any dihydroxy moiety capable of undergoing aromatic nucleophilic substitution, X is any difunctional moiety capable of undergoing aromatic nucleophilic substitution, and the number average molecular weight of the phenylethynyl-terminated poly(arylene ether) is between about 1,000 and 100,000.

2. A phenylethynyl-terminated poly(arylene ether) of claim 1, wherein Ar is a bisphenolic moiety.

3. A phenylethynyl-terminated poly(arylene ether) of claim 2 wherein Ar is a member selected from the group consisting of

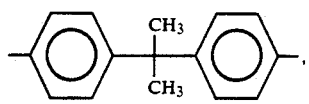

-continued

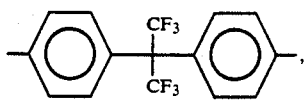

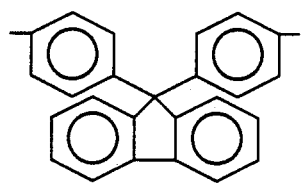

and X is a member selected from the group consisting of

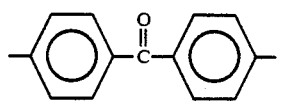

and

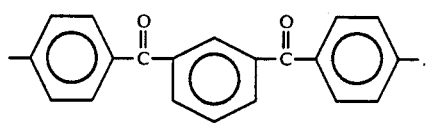

4. A phenylethynyl-terminated poly(arylene ether) of claim 3, wherein the number average molecular weight is between about 3,000 and 15,000.

5. A phenylethynyl-terminated poly(arylene ether) of claim 4, wherein the number average molecular weight is between about 3,000 and 9,000.

6. A phenylethynyl-terminated poly(arylene ether) of claim 5, wherein

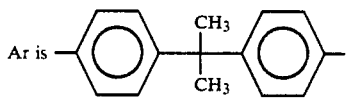

and

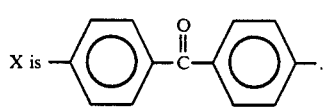

7. A phenylethynyl-terminated poly(arylene ether) of claim 5, wherein

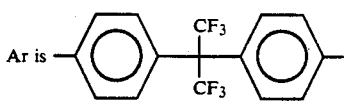

and

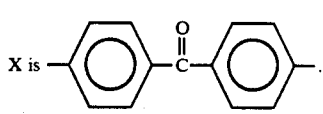

8. A phenylethynyl-terminated poly(arylene ether) of claim 5, wherein

Ar is 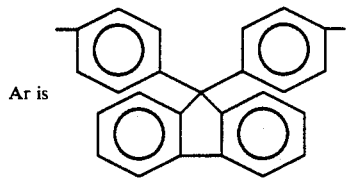

and

X is 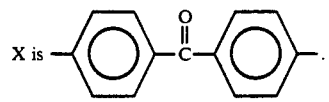

9. A phenylethynyl-terminated poly(arylene ether) of claim 5, wherein

Ar is 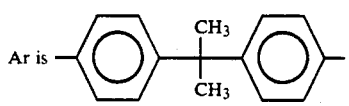

and

X is 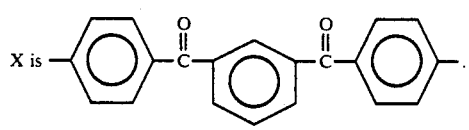

10. A phenylethynyl-terminated poly(arylene ether) of claim 5, wherein

Ar is 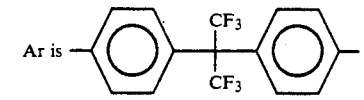

and

X is 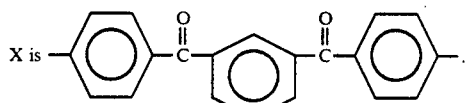

11. A phenylethynyl-terminated poly(arylene ether) of claim 5, wherein

Ar is 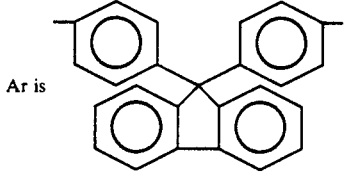

and

X is 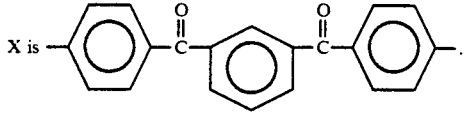

12. A molding prepared from a phenylethynyl-terminated poly(arylene ether) of claim 5.

13. A film prepared from a phenylethynyl-terminated poly(arylene ether) of claim 5.

14. An adhesive prepared from a phenylethynyl-terminated poly(arylene ether) of claim 5.

15. A graphite composite prepared from a phenylethynyl-terminated poly(arylene ether) of claim 5, which is employed as a matrix.

* * * * *